United States Patent [19]
Unkle, Jr. et al.

[11] 3,717,505

[45] Feb. 20, 1973

[54] ELECTROCHEMICAL CELL STACK

[75] Inventors: Truman F. Unkle, Jr., Poway; John F. Loos, San Diego, both of Calif.

[73] Assignee: Gulf Oil Corporation

[22] Filed: June 25, 1970

[21] Appl. No.: 49,696

[52] U.S. Cl. ..................................136/86 A, 136/86 R
[51] Int. Cl. ......................H01m 27/02, H01m 29/04
[58] Field of Search ....................136/86 R, 86 A, 176

[56] References Cited

UNITED STATES PATENTS

| | | | |
|---|---|---|---|
| 3,126,302 | 3/1964 | Dueshella | 136/86 R |
| 3,530,005 | 9/1970 | Leonard | 136/86 R |
| 3,556,862 | 1/1971 | Fox | 136/176 |
| 3,359,136 | 12/1967 | Merten et al. | 136/86 A |
| 3,462,307 | 8/1969 | Voochies et al. | 136/86 A |
| 3,298,867 | 1/1967 | Diotalevi | 136/86 R |

*Primary Examiner*—Allen B. Curtis
*Attorney*—Anderson, Luedeka, Fitch, Even and Tabin

[57] ABSTRACT

A cell stack for use in a battery or fuel cell using a liquid electrolyte. A plurality of individual frames made from electrically insulating material, each having a cavity extending transversely therethrough and separate elongated supply and return electrolyte passageways leading to and from the cavity. An electrode assembly is disposed in a recess provided in one surface of one of the frames and sandwiched between it and another frame. Each frame is bonded to the next adjacent frame to provide a complete seal surrounding the periphery of the cavity, each group of two adjacent electrode assemblies and three frames providing an electrochemical cell. The frames may be injection-molded from polysulfone and solvent-bonded by a chlorinated hydrocarbon.

3 Claims, 6 Drawing Figures

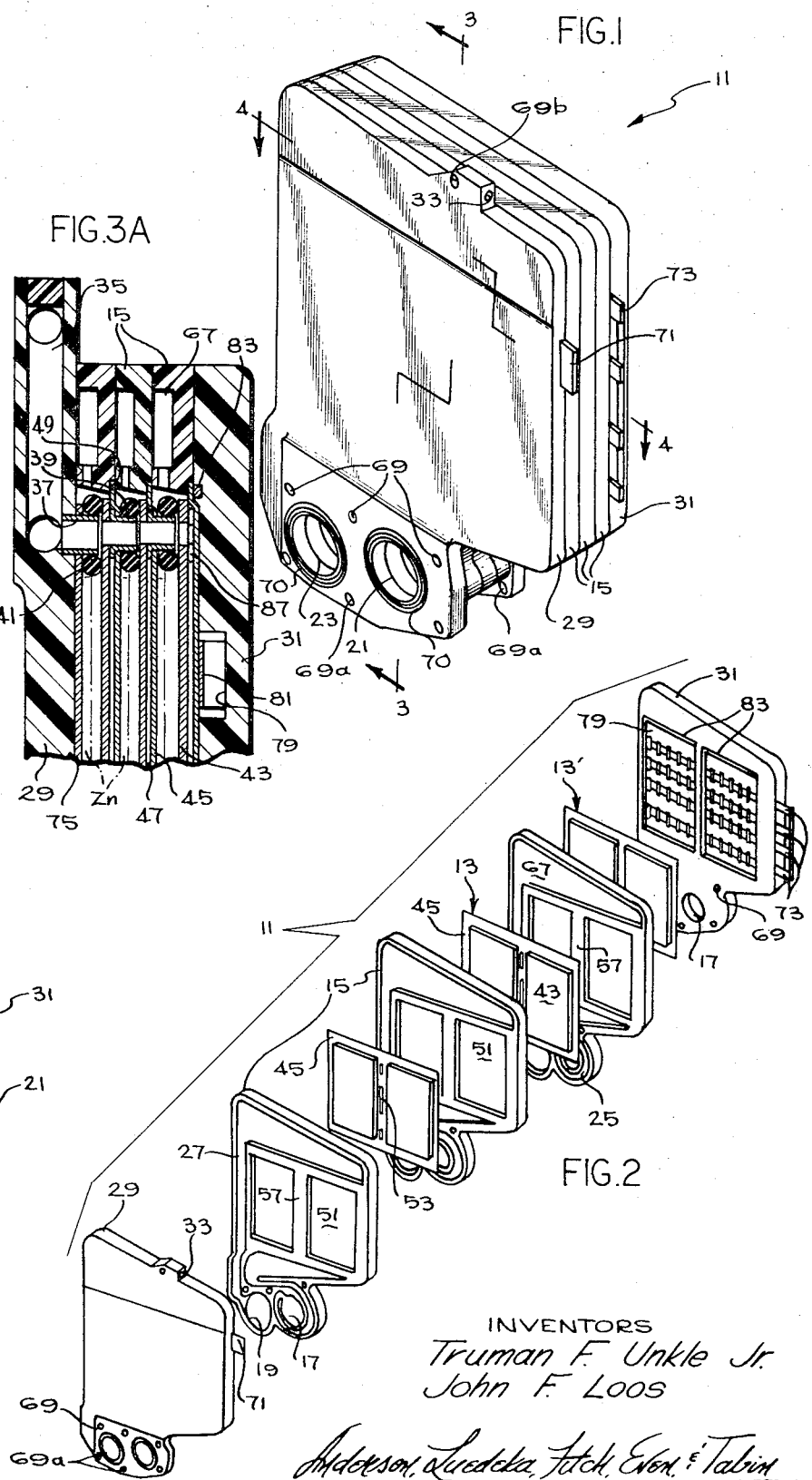

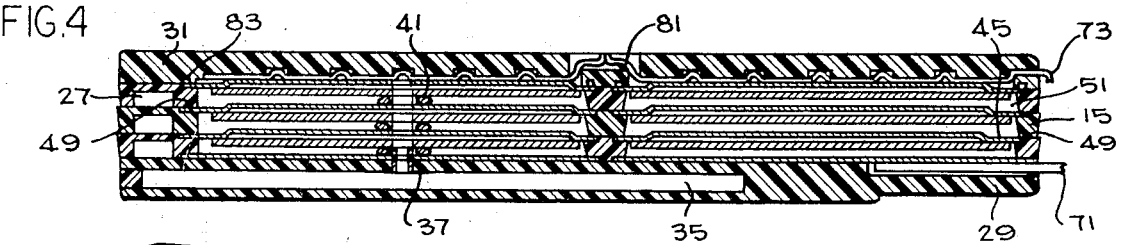
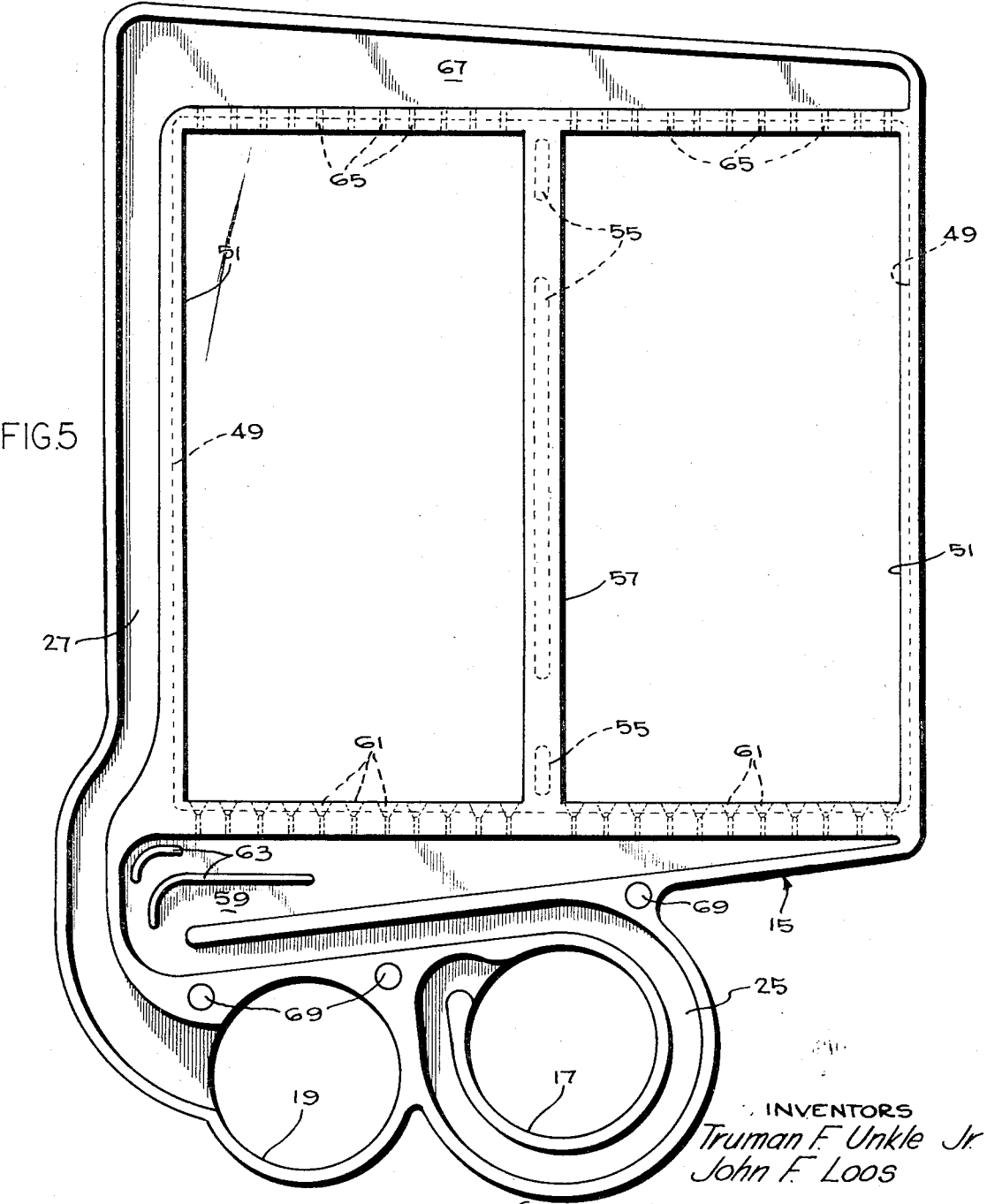

ELECTROCHEMICAL CELL STACK

This invention relates to electrochemical cell stacks and more specifically to stacks of electrochemical cells using a liquid electrolyte and to methods for making such cell stacks.

Electrochemical devices, such as batteries and fuel cells, have long employed a plurality of individual electrochemical cells which are electrically interconnected in a manner to produce the voltage-amperage characteristics desired in such an electrical power providing device. Various methods have been devised to incorporate a plurality of electrochemical cells into a composite cell stack; however, many of these methods have not been considered suitable for a production line operation. When a liquid electrolyte is employed with the cell stack and particularly when that electrolyte is circulated throughout the cell stack, there are additional problems attendant to the design of a cell stack because of the potential for leaks at locations where the electrolyte enters and leaves each of the electrochemical cells. Accordingly, improved methods for making cell stacks of this general type and improved designs are desired which take into consideration the above-mentioned factors.

It is an object of the present invention to provide an improved cell stack utilizing a plurality of electrochemical cells and a circulating liquid electrolyte. Another object of the invention is to provide an improved method for making an electrochemical cell stack designed to employ a circulating liquid electrolyte. A further object is to provide an improved cell stack utilizing electrode subassemblies which are held in frames of electrically insulating thermoplastic material.

These and other objects of the present invention will be apparent from the following detailed description of a cell stack and methods for making same when read in conjunction with the accompanying drawings wherein:

FIG. 1 is a perspective view of an electrochemical cell embodying various features of the invention;

FIG. 2 is an exploded perspective view, reduced in size, of the cell stack shown in FIG. 1;

FIG. 3 is a vertical sectional view taken generally along the line 3—3 of FIG. 1;

FIG. 3A is a fragmentary enlarged view of the upper portion of FIG. 3;

FIG. 4 is a horizontal sectional view taken generally along the line 4—4 of FIG. 1; and FIG. 5 is an enlarged elevation of one of the individual frames shown in FIG. 2.

Very generally, a method is provided for making cell stacks 11 of any number of electrochemical cells by serially uniting a plurality of individual assemblies each of which assemblies contain an electrode subassembly 13 that is supported in a surrounding frame 15 of thermoplastic material. The thermoplastic frames 15 are designed to permit inexpensive manufacture, as by injection molding, and each has formed in its front surface an open trough system for carrying liquid electrolyte to and away from the individual electrochemical cells, the bounds of which are generally defined by the frames. Each trough system connects with a pair of openings 17,19 in the individual frames which when assembled constitute an electrolyte inlet 21 and outlet 23 for all of the cells in the cell stack.

The rear surface of each individual frame 15 is flat in the regions wherein, in the front surface thereof, this trough system is located. Accordingly, when the frames 15 are assembled with one another, the open trough system is transformed to a closed supply passageway 25 and a closed return passageway 27. The frames 15 are suitably bonded, preferably by using an organic solvent for the thermoplastic material, to seal one to the next in the regions bordering the trough system and around the entire periphery of the frames. When two frames 15 are bonded to each other, the electrode subassembly 13 is sealed in its operating position, sandwiched between two frames. Addition of another frame 15 and electrode subassembly 13 to the three-component sandwich completes one electrochemical cell, which is made up of single electrodes from two adjacent electrode subassemblies 13. A cell stack 11 of any desired number of electrochemical cells can be constructed in this relatively simple manner wherein the individual assemblies are handled and added one at a time.

In the illustrated cell stack 11, as perhaps best seen in FIGS. 1 and 2, there are depicted a front end plate 29 and a rear end plate 31 which have three frames 15 disposed therebetween. This illustrated cell stack 11 includes three electrochemical cells arranged in series, with one electrochemical cell being located generally in the region defined by each of the frames 15, as will be more clear hereinafter. It should be understood that such a three-cell arrangement is shown primarily for purposes of illustration and that, in actuality, cell stacks using a larger number of cells, for example 15 cells, connected in series would likely be employed in order to provide the higher electrical power generating capabilities desired for most commercial applications. However, the principles of the cell stack assembly and operation will be readily apparent from the following description of illustrated three-cell arrangement.

The electrolyte inlet 21 and the electrolyte outlet 23 are located near the bottom of the cell stack and extend parallel to each other transversely therethrough. The electrolyte inlet 21 is composed of the aligned openings 17 which are provided in the end plates 29, 31 and in each of the frames 15. Similar aligned openings 19 constitute the outlet 23 in the assembled cell stack. The illustrated cell stack 11 is designed for operation with electropositive metal electrodes, of a material such as zinc, and with electrodes utilizing a gaseous electronegative material, such as oxygen.

In the illustrated embodiment, oxygen is supplied to the electrode subassemblies 13 either in the form of oxygen or air, and accordingly a gas inlet 33 is provided in the upper portion of the front end plate 29. This inlet 33 leads to an internal passageway system 35 in the front end plate which is connected by suitable fittings 37 to both of the electrodes of the first electrode subassembly in line. As best seen in FIGS. 3A and 4, these fittings 37 provide a gas to the front surface of the first electrode assembly, and each electrode assembly 13 includes integral couplings 39 which extend from the rear face thereof and connect to each subsequent electrode in line, thereby supplying oxygen to each of the electrode subassemblies. Suitable O-rings 41 are provided adjacent each electrode subassembly and surrounding the fittings 37 and couplings 39 to seal the oxygen passageways against leakage. Although, because of the location of the section line 4—4 (FIG. 1), only the lefthand gas distribution system is shown in FIG. 4, a similar gas distribution arrangement is also provided for the righthand electrodes of the electrode assemblies 13.

Each of the electrode subassemblies 13 includes a pair of rectangular porous plates 43 which constitute the electrodes through which the oxygen is supplied to the electrolyte interface in the electrochemical cells. These porous plates 43 are mounted in side-by-side arrangement by attachment in pairs to thin backing plates 45. The backing plates 45 are deformed to provide a region, of somewhat smaller dimensions than the porous plates 43, between the plates which region serves as a plenum chamber 47. Each backing plate 45 is suitably electrically and mechanically connected to a porous plate 43 along a line surrounding the periphery of this deformed region to seal the edges of the plenum chamber 47 so that the oxygen can diffuse only through the porous plate 45. The porous plates 43 are made of a suitable electroconductive material, such as sintered nickel, and the thin metallic backing plates 45 are made of a suitable metal, such as mild steel or nickel. The plates may be electrically and mechanically joined by welding or brazing.

The rectangular backing plates 45 are planar along their periphery and, as best seen in FIGS. 3A and 4, are seated in recesses 49 provided in the rear surfaces of the frames 15. When an electrode subassembly 13 is seated in a frame 15, the pair of porous electrodes 43 protrude into and are located generally centrally within a pair of openings or vacant portions 51 of the frames which extend transversely therethrough. To further assist in the desired spacing and positioning of the electrode subassemblies, three generally vertically extending slots 53 are cut in the central region of the backing plates 45. These slots 53 accept lugs 55 provided on the frames 15 and facilitate the assembly of the overall cell stack 11 as hereinafter indicated.

As earlier indicated, the intermediate frames 15 are designed to be inexpensively produced, as by injection molding, from thermoplastic material, and they are formed with the two side-by-side vacant portions 51 which, after assembly, each define an electrochemical cell region. The recesses 49 formed in the rear surface of the frames 15 accept and seat the peripheral edges of the backing plate 45 of an electrode subassembly 13. The upstanding lugs 55 which fit into the elongated slots 53 provided centrally in the electrode backing plates are formed on the rear surface of a vertical bar portion 57 of the frame 15 which separates the two vacant portions 51. Formed in the front surface of the frames 15 are the pair of open troughs 25,27 which respectively carry the liquid electrolyte to and from the vacant portions 51 which define the individual electrochemical cells.

More specifically, the supply passageway 25 is defined by a trough that is in communication with the entrance opening 17 which constitutes part of the electrolyte inlet 21. As best seen in FIG. 5, the supply passageway trough 25 first loops around the opening 17 and then extends via a straight section to the lefthand side of a distribution chamber portion 59 which underlies the two vacant portions 51 of the frame. The electrolyte supply passageway 25 is purposely designed with the long length indicated to achieve the desired intra-cell electrical isolation. Previously, long individual inlet tubes were considered necessary to minimize self-discharge between cells, and it is considered to be an advantage of the illustrated frame design that such long supply and return passageways are incorporated within the frame itself. To achieve the desired intra-cell isolation, it has been determined that the individual passageways should be at least about 30 cm. long and have a cross section not greater than about 0.5 sq. cm. or the equivalent.

Assembly of the cell stack is also facilitated because the molded frames individually contain the electrolyte supply and return passageways for all of the electrochemical cells, and now only two plumbing connections are required for the entire cell stack. Short vertical, tapered inlet holes 61 are formed in the lower portion of each of the frames 15 and lead from the distribution chamber 59 upward into the vacant portion 51 along the lower edge thereof. A pair of flow-directing baffles 63 are molded in the frame 15 and the upper lefthand corner of the distribution chamber 59 to facilitate smooth flow therethrough.

The electrolyte flows upward through the electrochemical cells defined by the vacant portions 51 and exits therefrom via short holes 65 along the top edge of the vacant portions 51 which lead into an upper chamber 67 formed in the front surface of the intermediate frames 15 which is a portion of the electrolyte return passageway 27. From the chamber 67, the return passageway 27 extends along a long vertical section leading downward and into the side of the exit opening 19. The long flow path provided by the trough which forms the electrolyte return passageway likewise preserves the desired intra-cell electrical isolation between the series-connected cells in the cell stack 11.

Three tie-rod holes 69 are provided in the lower portion of the intermediate frames 15, and similar tie-rod holes 69 are also provided in the front and rear end plates 29,31. Three additional tie-rod holes 69a are also provided in the end plates 29,31 at locations below the bottoms of the individual frames 15. One hole 69b is provided at the top of the front plate 29. Annular recesses 71 are provided in the front surface of end plate 29 (FIGS. 3 and 4) to receive O-rings. If it is desired to couple one cell stack 11 to another, six tie-rods are inserted through the holes 69,69a and 69b, and O-rings are placed in the recesses 70 to seal the junctions in the electrolyte passageways 21 and 23.

The electrode subassemblies 13 are dual-functional electrodes. The porous plate 43 serves as the oxygen electrode, and zinc is deposited upon the exterior surface of the backing plates 45 to constitute the other electrode, as shown in dotted outline in FIG. 3A. As previously indicated, a cell stack 11 might include some 15 electrode assemblies 13 and 15 mating frames 15 and thereby provide a 15-cell series-connected system. The terminal assemblies 71,73 are respectively provided in the front and rear end plates 29, 31 and brazed to end plate 75 and back plate 45 respectively, for making external electrical connections to the electrochemical cells. Four separate terminal strips are connected by a bus to provide a single external connection at the terminal 73. The first electrode assembly 13 provides the porous nickel electrodes for the front electrochemical cell and a separate support plate 75 is provided, between the rear surface of the front end plate 29 and the first frame 15, upon which plate zinc is electrochemically deposited to constitute zinc electrode for the first cell in line. As best seen in FIG. 4, the terminal assembly 71 includes a conductor, which may be a thin nickel and silver-plated copper strip, located in the front end plate 29 which strip connects the support plate 75 to the external terminal.

The bi-functional electrode subassemblies 13 electrically interconnect the porous oxygen electrode of one cell and the zinc electrode of the next adjacent cell in series throughout the cell stack 11. Recesses 79 are provided in the forward face of the rear plate 31 wherein the four-strip conductor network 81 resides which is part of the rear terminal assembly 73 and makes electrical contact with the rear surface of the backing plate 45 of the last electrode subassembly 13 in line. This backing plate 45 does not support a zinc deposit as do the backing plates of the other subassemblies. The four strips of the conductor network 81 extend exterior of the cell stack 11, as best seen in FIG. 4, where they are connected to a bus which serves as the terminal 73. Suitable gaskets 83 (FIG. 3A) may also be provided in the front face of the rear end plate 31 to assure a good seal around the periphery of the rearmost electrode subassembly 13.

As one example of how assembly of the cell stack might be carried out, the front end plate 29 is first located, with its forward surface down, in an assembly jig having a shape that is proportioned to register with the exterior contour of the frames 15. A pattern of bonding agent is then applied to either the rear surface of the front end plate or the front surface of the first intermediate frame 15. An organic solvent for the thermoplastic material is preferably used as the bonding agent. However, other adhesives may be used as the bonding agent. When polysulfone is used for the frames, a chlorinated hydrocarbon, such as methylene chloride is preferably used as the bonding agent.

The solvent is conveniently applied by placing the intermediate frame 15, with its front surface (as viewed in FIG. 5) face down on a saturated felt applicator. The single electrode support plate 75 is then disposed atop the front end plate 29 and O-rings 41 are slipped over the ends of the fittings 37 which protrude through the support plate 75. The frame 15 is disposed in surface-to-surface contact with the rear surface of the front end plate 29. Pressure is applied and is maintained for a period of time sufficient for the solvent to evaporate, thus assuring a good bond between the first intermediate plate 15 and the front end frame 29.

An electrode subassembly 13 is now located in the upper surface of the frame presently in the assembly jig, and because the rear face of the intermediate frame 15 is disposed upward, alignment is facilitated of the edges and slots 53 of the electrode backing plate in the recesses 49 and with the upstanding lugs of the intermediate frame. O-rings are fitted over the protruding portions of the couplings 39 which extend from the rear face of the electrode assembly. The front surface of the next intermediate frame 15 is then treated with the solvent. It is disposed in the jig, and pressure is again applied to unite it to the earlier-bonded frame and front end plate. Bonding of the second frame 15 entraps the electrode subassembly 13 between the two frames. Repetition of these steps is then carried out to sandwich another electrode subassembly 13 between the second frame and a third frame. In commercial production, the cell stack 11 might be, for example, built up to employ 15 such intermediate frames and electrode subassemblies.

After the last frame has been bonded in place, an electrode subassembly 13', which is generally the same as those previously employed except for its gas passageway system, is positioned in the recesses 49 in the rear face of the third frame. As best seen in FIG. 4, the last electrode subassembly 13' has no couplings 39 extending from the backing plate and incorporates a radially-slotted grommet 87, which maintains the desired spacing between the porous electrode 43 and the backing plate 45 in the region of the plenum chamber 47.

The forward surface of the rear end plate 31 then has the desired solvent pattern applied thereto, and with the current collector network 81 and the two peripheral gaskets 83 in place, it is positioned atop the components already in the assembly jig. The front and rear end plates 29,31 of the cell stack are compressed together to complete the bonding operation.

The cell stack 11 thus created is ready for operation after suitable electrical connections are made to the terminals 71 and 73 extending from the righthand side of the front and rear end plates 29,31. A source of oxygen under suitable pressure, for example 5–10 psig., is connected to the gas inlet 33. The liquid electrolyte may, for example, be a 20 percent by weight aqueous potassium hydroxide solution. Suitable plumbing connections are made to the electrolyte inlet 21 and outlet 23, and pumping is begun to fill the passageways 25,27 and the vacant portions 51 of the cell stack 11 with electrolyte and continue circulation and recirculation of the electrolyte therethrough. To electrically charge the cell stack 11, liquid electrolyte which is saturated with zinc oxide is pumped therethrough while appropriate electrical potential is applied to the electrodes. This causes metallic zinc to be electrochemically deposited upon the surfaces of the backing plates 45 which are in contact with the electrolyte in the individual cells.

During the charging process, oxygen is liberated at the porous nickel electrodes 43, and this oxygen is carried with the circulating electrolyte stream out of the cell stack where it is subsequently separated, as by using a suitable gas-liquid separator. A more detailed explanation of the electrochemical operation of the cell stack is set forth in U. S. Pat. No. 3,391,027, issued July 2, 1968 to J. T. Porter II. After zinc metal deposits of the desired amount have been built-up on the backing plates 45 and the support plate 75 within the central regions of each of the frames 15 that constitute the individual electrochemical cells (as indicated in phantom outline in FIG. 3A), the cell stack 11 is ready for operation. Thereafter, whenever an electrical load is connected across the terminals 71 and 73, and an oxygen-containing gas is supplied to the gas inlet 33 at a sufficient pressure to cause it to permeate through the porous plates 43 to the electrolyte interface, and a sufficient circulation of electrolyte is maintained throughout the cell stack 11 to carry away the zinc oxide reaction products, electrical power generation will occur.

It is considered that the invention provides a simple and an extremely economical cell stack design which is particularly suited for production line assembly. There are considerable advantages in both production and in performance which result from the solvent-bonding of one frame to another. Assembly of the cell stack in this manner eliminates the need for the employment of pressure plate and spring arrangements which were heretofore used to maintain the integrity of and to prevent leaks from occurring in a multiple cell stack of this type. Moreover, whereas it was previously considered necessary to employ a plurality of relatively long tubes to make individual inlet and outlet connections to each electrochemical cell in a series-connected cell stack, in order to achieve electrical isolation between the cells of the stack, the illustrated frame design integrally incorporates passageways of the desired length as a part of the trough system. This design obviates this multitude of individual connections, which were previously a source of potential leaks, by molding them as an integral part of the frame, and it further facilitates production assembly by minimizing the number of plumbing connections.

Although the invention has been illustrated with regard to certain preferred embodiments, it should be understood that modifications and changes such as would be obvious to one having the ordinary skill of this art can be made without deviating from the spirit of the invention. Various of the features of the invention are set forth in the claims which follow.

What is claimed is:

1. A cell stack for use in an energy conversion system using a liquid electrolyte, which comprises a plurality of metallic electrode assemblies, each of said electrode assemblies including a porous plate to which an electrochemically reactive gas is supplied to provide one-half of the electrochemical couple and an impervious plate electrically and mechanically bonded to said porous plate, portions of said impervious plate being spaced from said porous plate to provide a gas plenum chamber therebetween, said impervious plate being adapted to support a deposit of an electropositive metal on the surface opposite from said plenum chamber, said electrochemical cells including a porous plate from one electrode assembly and an electropositive metal deposit from the next adjacent electrode assembly, a plurality of frames made from an electrically insulating material, each of said frames having a cavity therein which extends transversely therethrough and each also including separate elongated supply and return electrolyte passageways leading to and from said cavity, each electrode assembly being disposed in a recess provided in one surface of one of said frames, said electrode assemblies being sandwiched between adjacent pairs of said frames, the surfaces of each said frames being bonded to said next adjacent frame in a manner to provide a complete seal surrounding the periphery of said cavity, said electrolyte supply and return passageways being in the form of open troughs in one surface of said frames which are closed by the abutting surface of the adjacent bonded frame, said supply and return passageways being respectively in fluid communication with a pair of openings extending transversely through said frame and being both disposed below said recess, said pairs of openings in all said frames being located in aligned relationship in said cell stack and constituting parallel electrolyte inlet and outlet conduits for all of said electrochemical cells in said stack, said trough in each frame which at its one end communicates with said transverse inlet opening completely encircling said opening and communicating at its other end with a distribution chamber leading to the bottom of said cavity, each group of two adjacent electrode assemblies and three frames providing an electrochemical cell.

2. A cell stack in accordance with claim 1 wherein said supply and return passageways are each at least about 30 centimeters in length and not greater than about 0.5 cm.$^2$ in cross section to assure intracell electrical insulation.

3. A cell stack in accordance with claim 1 wherein said frames are made of polysulfone and each frame is solvent-bonded to the next adjacent frame.

* * * * *